United States Patent Office 3,220,872
Patented Nov. 30, 1965

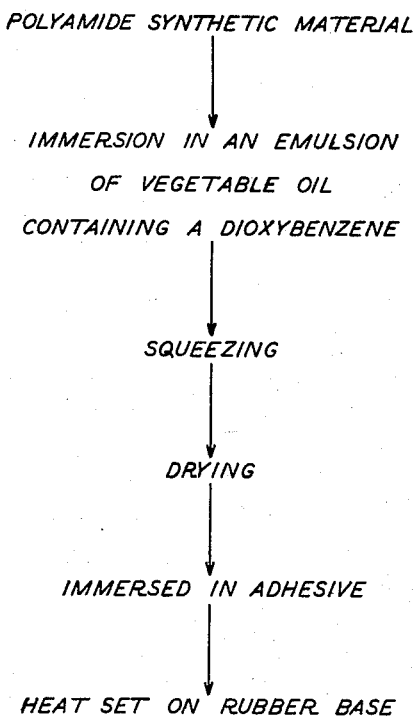

3,220,872
TREATED POLYAMIDE SYNTHETIC FIBERS FOR ADHERENCE TO RUBBER MATERIALS
Takashi Nakane, Tokyo, and Takeo Kubota and Yoshiro Umezawa, Fujisawa-shi, Japan, assignors to The Yokohama Rubber Company, Limited, Tokyo, Japan, a corporation of Japan
Filed Apr. 25, 1962, Ser. No. 189,999
Claims priority, application Japan, May 1, 1961, 36/15,193
19 Claims. (Cl. 117—47)

The present invention relates to a method for improving the properties of polyamide synthetic fibers to be adhered to rubber materials. More particularly, it relates to a method to endow polyamide synthetic fibers to be used as industrial fiber material with an improved adhesiveness to rubber materials, as well as enhanced heat-resistance and fatigue-resistance, thereby to yield reinforcing materials to strengthen rubber products.

In another aspect, the present invention relates to an improvement in the process of adhesion of polyamide synthetic fibers to rubber materials, in which the fibers are treated with a specific composition of substances no later than the adhesion stage.

When using an industrial fiber material as rubber reinforcing material, the requirements ordinarily include a high heat-resistance of the fiber materials themselves and the strength of their adhesion to, or binding with, the rubber materials. In major rubber products, for instance, automobile tires, belt conveyors, and the like, high heat-resistance and fatigue-resistance are required, in both the reinforcing fiber materials themselves and the adhered or bound materials composed of the fiber and rubber. From these points of view, the reinforcing fiber materials and the reinforced rubber materials conventionally available were not fully satisfactory.

Thus, an object of the invention is to provide reinforcing fiber materials having enhanced heat- and fatigue-resistances and an improved adhesiveness to rubber, as compared with the rubber materials heretofore known. Another object is to provide rubber materials reinforced with the fiber materials, having excellent heat- and fatigue-resistances, as compared with the rubber materials heretofore known. Still another object is to provide a novel method for improving the properties of polyamide synthetic fibers by treating the same with a specific composition of substances. Still another object is to provide an improved process of adhesion of polyamide synthetic fibers to rubber material, by which an improved rubber materials having greater heat- and fatigue-resistances than those in the conventional ones are obtained.

Such objects are accomplished, according to the method of the present invention, by treating a polyamide syntheic fiber to be employed for reinforcement of rubber materials, with a dilute aqueous emulsion of a vegetable oil containing a dioxybenzene.

In another aspect, such objects are accomplished by adhering a polyamide synthetic fiber to a rubber material to be reinforced, which fiber has been treated with a dilute aqueous emulsion of a vegetable oil containing a dioxybenzene at latest at the stage of the adhesion.

The polyamide synthetic fiber to be employed for reinforcement of rubber materials, according to the present invention, may be any of the known and conventionally employed industrial fiber materials, including various types, such as 6-type and 66-type nylon having various denier. These are commercially available as nylon tire cord, nylon belt duck, nylon chafer, and the like.

Any kind of vegetable oil may be used in the present invention, but drying or semi-drying vegetable oils are more preferable. Typical examples include cotton seed oil, linseed oil, China-wood oil, sesame oil, rape seed oil, soybean oil, olive oil, and the like, as well as any mixture thereof.

The dioxybenzenes include pyrocatechine, resorcin, hydrochinone, and mixtures thereof, among which hydrochinone is the most preferred. The amount of dioxybenzene employed is not more than 50% and preferably not less than 5%, by weight, based upon the weight of the vegetable oil.

The invention will next be described with reference to the drawing wherein a flow sheet of the method is illustrated.

The vegetable oil and the dioxybenzene, used for the treatment of the polyamide synthetic fiber materials, are contacted with the fiber materials in the form of a dilute aqueous emulsion in a concentration of 20% to 3%, and preferably between 10% to 5%, of the total weight of both agents. For the preparation of the dilute aqueous emulsion, an emulsifier and other adjuvants may be added to aid the emulsification of the agents, if required. Examples of the emulsifier include, casein, polyoxyethylene alkyl ether, ester and others.

According to the invention, a polyamide synthetic fiber material used for reinforcement of rubber materials is immersed into the emulsion of a vegetable oil containing a dioxybenzene at least for a while under a lower degree of tension, ordinarily at room temperature. Thereafter, the fiber material is taken out of the emulsion and squeezed, for example, with a squeeze roll or a beater. In this case, the period of immersion and the degree of squeeze are so adjusted, for example by the squeezing pressure or beater conditions (such as lap and rotation), that the total weight of the treating agents incorporated with the material is within a range between 5% and 0.3% by weight per weight of the fiber material. The fiber material is then dried at a temperature of 50° to 160° C. to dehydrate it up to a moisture content of less than 15% by weight.

The treatment of the fiber materials with an aqueous emulsion of a vegetable oil containing a dioxybenzene, according to the invention, may be conducted at any stage of the processes, from the spinning of the polyamide fibers to the adhesion of the fiber materials to rubber, but no later than the stage of the adhesion. For example, the treatment may be accomplished at the step of spinning of the polyamide synthetic fibers in filament form, after making the fibers in yarn, cord or fabric form, at the step of immersing, or spraying, the cord or fabric into, or with, an adhering liquor by admixing the treating liquor therewith, or just before or after the actual step of adhesion during the adhesion stage.

The treatment of the polyamide synthetic fibers, according to the invention, is particularly effective, when resorcin-formaldehyde-latex adhering liquor is used for the adhesion of the fiber materials to rubber materials.

The polyamide synthetic fibers treated as mentioned above have, when used as material for reinforcement of rubber, improved softness, and heat- and fatigue-resistances, in themselves, and secure a powerful adhesion to, or binding with, rubber materials, thereby serving for improvement of the quality and prolongation of the life of the products.

In general, polyamide fiber materials used for the reinforcement of rubber materials are heat set prior to the adhesion to improve the dimensional stability, in other words, to keep the elongation stable and to remove the stress. The heat-setting is effected at a higher temperature, such as about 200° C. for a short period of time under a higher tension. The treatment of the fiber materials according to the invention prevents hardening and other deterioration thereof as well as loss of adhesiveness, caused by such higher temperature.

The method of the invention and the concrete effectiveness thereof will be further described with reference to the examples, which are, however, set forth by way of illustration and not by way of limitation.

EXAMPLE 1

This example illustrates a case where the treatment according to the present invention is applied to a nylon tire cord at a step just before the adhesion to a rubber material.

A 7.5% water emulsion containing 2.5% of hydrochinone and 5.0% of cotton seed oil and emulsified by use of casein is prepared, as a treating agent to enhance the heat-resistance and the adhesiveness of the nylon cord to the rubber.

A nylon (66-type) tire cord of 840 D/2, made by Du Pont de Nemours Co. Ltd., is immersed into the emulsion at room temperature prior to the ordinary adhering treatment, while the cord is kept under a lower degree of tension. The excess of the emulsion taken up with the cord is removed by means of a squeeze roll. The cord is, thereafter, dried on a drum drier to dehydrate up to moisture content of about 4%, immersed into a resorcin-formalin-latex liquor, and, heat-set at 200° C. for 24 seconds under a tension of 1.8 kg./cord. The tire cord thus treated has a high flexibility, an enhanced heat-resistance and fatigue-resistance and an increased adhesiveness.

The following Table 1 sets forth the comparison of the properties of the cord (A) which is treated according to the present invention, and the conventional cord (B) which is untreated.

Table 1

| Test items | Treatment (A) | Treatment (B) |
|---|---|---|
| Strength of cord: | | |
| Conditioning | 14.3 kg | 13.9. |
| 180° C., 2 hrs | 11.9 kg | 7.1 kg. |
| 180° C., 3 hrs | 10.2 kg | 5.3 kg. |
| Ferry life | 11 hours | 4 hours. |
| Adhesiveness of cord (H-test):* | | |
| 130° C., 1 hr | 12.9 kg | 10.8 kg. |
| 160° C., 1 hr | 10.4 kg | 7.7 kg. |
| 24 hrs. immersion in water | 6.7 kg | 4.4 kg. |

*Lyons, Nelson & Conrad: I.R.W. 14 213 (1946).

The results of ferry life test are shown by time in hours before the cord tears when it is fatigued by heating and repeated loading by a cord tension vibrator manufactured by B. F. Goodrich Co., U.S.A. The conditions for the test include a temperature of 180° C., charge of 3 kilograms, stroke of $32'' \times 10^{-3}$, and rotation of 3,600 r./min. The H-test after 24 hours immersion in water is carried out by immersing the test pieces in water for 24 hours and then effecting the H-test.

As seen from the results, the nylon cord pre-treated with the aqueous emulsion of the oily agent prepared from a vegetable oil and a dioxybenzene, according to the present invention, has enhanced heat- and fatigue-resistances, and exceedingly improved adhesiveness.

In the above example, the improvement of the properties of polyamide synthetic fibers was exemplified with reference to nylon tire cord. However, nylon duck, nylon chafer or any of other polyamide synthetic fibers can be used as the industrial fiber material to be treated according to the present invention, instead of the nylon tire cord.

Furthermore, the treatment of the polyamide fibers according to the present invention may be effected at the spinning step, at the step of immersing, or spraying, cord or fabric of the fibers into, or with, an adhering liquor by admixing the treating liquor therewith, or just before or after the step of the adhesion, namely no later than at the stage of adhesion.

EXAMPLE 2

This example illustrates some cases where a pick fabric of 6-type nylon (Caprolan, made by Allied Chemical Corporation) is treated by aqueous emulsions containing various types of vegetable oil and various types of dihydroxybenzene, according to the invention.

The aqueous emulsion was prepared by use of soybean oil, cotton seed oil, or olive oil, as follows:

| Composition #1: | Parts by weight |
|---|---|
| Water | 88.9 |
| Aqueous ammonia (28%) | 0.1 |
| A dioxybenzene | 1.0 |
| Composition #2: | |
| Water | 4.6 |
| Aqueous ammonia (28%) | 0.2 |
| Casein | 0.2 |
| A vegetable oil | 5.0 |
| | 100.0 |

The compositions #1 was first prepared by dissolving the ammonia and then the dioxybenzene into water while being stirred. The composition #2 was prepared by adding the ammonia and casein to water heated to 60° to 70° C. while being stirred; stirring for an addition 10 min. to form a clear solution; adding slowly the vegetable oil thereto; stirring for about 20 min.; subjecting the mixture to a homogenizing treatment to form a homogeneous dispersion; adding the composition #1 slowly while being stirred to form a homogeneous mixture; and subjecting the mixture to a homogenizing treatment to finish the blend.

Through the aqueous emulsion thus prepared and placed in an immersing bath, a tire cord (pick fabric) of Caprolan, 840 D/2, was passed with a retention time of 5 seconds. During the immersion, the tension applied to the cord was 100 g./cord, and the temperature of the emulsion was 15° C. The cord taken out of the immersing emulsion was squeezed with a squeezing roll to remove the excess emulsion taken up with the cord, and then dried on a steam drum at 90 lbs./inch² pressure. After the drying, the moisture content was 5.2% by weight.

The cord was then immersed into a resorcin-formalin-latex liquor, and subsequently heat-set.

The cords thus treated according to the invention have an improved adhesiveness to rubber and enhanced heat- and fatigue-resistances. The following Table 3 sets forth the comparative properties of the treated and those not treated according to the invention.

Table 3

| Test items | (a) Oil: Soybean oil | (b) Cotton seed oil | (c) Olive oil | (d) Cotton seed oil | (e) None |
|---|---|---|---|---|---|
| | Dioxybenzene | | | | |
| | o- | m- | p- | p- | p- | None | None |

| Test items | o- | m- | p- | p- | p- | None | None |
|---|---|---|---|---|---|---|---|
| Strength of cord: | | | | | | | |
| Conditioning | 14.3 | 14.4 | 14.2 | 14.4 | 14.0 | 13.8 | 13.5 |
| 180° C., 2 hrs | 10.2 | 10.5 | 11.4 | 11.4 | 11.0 | 8.9 | 7.7 |
| 180° C., 3 hrs | 8.1 | 9.2 | 10.0 | 9.8 | 9.5 | 6.7 | 5.5 |
| Adhesiveness of cord (H-test): | | | | | | | |
| 130° C., 1 hr | 12.8 | 13.1 | 12.7 | 13.0 | 12.9 | 12.2 | 10.5 |
| 160° C., 1 hr | 9.9 | 10.4 | 10.0 | 10.3 | 10.0 | 9.1 | 7.9 |

As seen from the results set forth in the table, the cords (a), (b) and (c) treated according to the invention have an improved adhesiveness and enhanced heat-resistance, as compared to the conventional cord (e). The effectiveness of the presence of dioxybenzenes is obvious from the data of (d). In this experimental series, p-dioxybenzene seems to be the most effective from the multilateral points of view.

EXAMPLE 3

This example illustrates the case in which a tire cord of 66 type nylon (RHB type of Chemstrand Corporation) is treated by aqueous emulsions having various concentrations and containing various proportions of cotton seed oil and hydrochinone, according to the invention.

Aqueous emulsions were prepared similarly as in the Example 2. In the twisting process of two of 840 D/140 Fil. nylon yarn (RHB type of Chemstrand Corporation), the yarns were passed through a bath containing said aqueous emulsion, and twisted in ply yarn 47.0 (Z), cord 43.0 (S) in 10 cm. distance. After the wet twisting, the cord was centrifuged to a moisture content of 4.5% by weight.

The thus produced 66-type nylon tire cord of 840 D/2 and 47 x 43 (per 10 cm.) twist was immersed in resorcin-formalin-latex liquor in ordinary manner and then heat-set. The results tested were as follows.

6-type nylon (Amilan type 700C-1, made by Toyo Rayon Co., Ltd.), fabricated in plain textile of 840 D/3/3 x 840 D/3, 45(warp) x 18(filling) per 5 cm., was treated according to the invention by use of a spreader.

A 5% aqueous emulsion containing soybean oil and resorcin (m-dioxybenzene) in the proportion of 100 to 20 parts by weight was prepared according to the procedure as in Example 2, and placed in a dipping tank of a spreader machine.

The belt duck was passed through the tank and squeezed by a squeeze roll. Then it was dried on a heated plate at 160° C. Upon roll-up, this fabric had a water content of 13% (by weight). The fabric was passed through a preliminary drying chamber at 140° C. for 10 min., before the immersion of the fabric into a resorcin-formalin-latex liquor. When compared with belt duck not treated according to the invention, this showed more than a 20% elevation of adhesiveness.

What we claim is:

1. A method for improving the properties of polyamide synthetic fibers to be adhesively secured to rubber materials to reinforce the same, which method comprises increasing the adhesive property of the fiber to the rubber materials while increasing the strength of the fiber at elevated temperature by immersing the polyamide synthetic fiber into an aqueous emulsion of a vegetable oil containing a dioxybenzene, the dioxybenzene being pres- Table 4

| Test items | (1) | (2) | (3) | (4) | (5) | (6) |
|---|---|---|---|---|---|---|
| | Samples, Oil/p-dioxy benzene | | | | | |
| | 100/50 | 100/30 | 100/30 | 100/30 | 100/5 | None |
| | Concentration (percent by weight) | | | | | |
| | 10 | 20 | 10 | 3 | 7.5 | ---------- |
| | Oil pick-up, percent | | | | | |
| | 2.3 | 4.9 | 2.5 | 0.3 | 2.0 | ---------- |
| Strength of cord: | | | | | | |
| Conditioning | 14.0 | 14.0 | 14.2 | 13.9 | 14.1 | |
| 180° C., 2 hrs | 9.9 | 10.0 | 10.3 | 9.7 | 10.0 | |
| 180° C., 3 hrs | 9.0 | 8.6 | 8.8 | 8.3 | 9.1 | |
| Adhesiveness of cord (H-test): | | | | | | |
| 130° C., 1 hr | 12.5 | 13.0 | 13.2 | 12.1 | 12.8 | |
| 160° C., 1 hr | 9.6 | 9.8 | 9.5 | 8.5 | 8.9 | |

It is obvious from the table that the treatment according to the present invention significantly improves the adhesiveness and heat-resistance of the fiber, as compared with the conventional method (6).

EXAMPLE 8

This example illustrates a case where a belt duck of ent in the vegetable oil in an amount between 5 and 50% by weight, drying the polyamide fiber and coating the fiber with an adhesive.

2. A method according to claim 1 wherein the fibers to be immersed are in the form of yarns.

3. A method according to claim 2 wherein the fibers to be immersed are in the form of cords.

4. A method according to claim 2 wherein the fibers to be immersed are in the form of fabrics.

5. A method according to the claim 1, wherein said dioxybenzene is hydrochinone.

6. A method according to the claim 1, wherein the immersion is performed while the fibers are being spun into yarn.

7. A method according to the claim 1, wherein said polyamide synthetic fiber is 66-type nylon.

8. A method according to the claim 1, wherein said polyamide synthetic fiber is 6-type nylon.

9. A method according to the claim 1, wherein said vegetable oil is cotton seed oil.

10. A method according to the claim 1, wherein said vegetable oil is soybean oil.

11. A method according to claim 1, wherein said vegetable oil is olive oil.

12. A method for improving the properties of polyamide synthetic fibers to be added to rubber materials to reinforce the same, which method comprises increasing the adhesive property of the fiber to the rubber materials while increasing the strength of the fiber at elevated temperature by immersing the polyamide synthetic fibers into an aqueous emulsion of a vegetable oil containing a dioxybenzene having a concentration of 20% to 3% of the total weight of both agents, the amount of the dioxybenzene being 50% to 5% by weight based upon the weight of the vegetable oil, squeezing the immersed fibers to obtain in the fibers 5% to 0.3% by weight of the total agents, drying the fibers at a temperature of 50° to 160° C. to dehydrate the fibers to a moisture content of less than 15% by weight and coating the fibers with an adhesive.

13. A method according to claim 12 wherein said adhesive is a resorcin-formalin-latex adhering agent, the synthetic fiber being treated with said emulsion prior to application on said fiber of said adhesive.

14. A method according to the claim 12, wherein said polyamide synthetic fiber is 66-type nylon.

15. A method according to the claim 12, wherein said polyamide synthetic fiber is 6-type nylon.

16. A method according to the claim 12, wherein said vegetable oil is cotton seed oil.

17. A method according to the claim 12, wherein said vegetable oil is soybean oil.

18. A method according to the claim 12, wherein said vegetable oil is olive oil.

19. A method according to the claim 12, wherein said dioxybenzene is hydrochinone.

References Cited by the Examiner

UNITED STATES PATENTS

| | | | |
|---|---|---|---|
| 2,061,565 | 11/1936 | Dreyfus | 117—139.5 |
| 2,067,951 | 1/1937 | Schneider | 117—139.5 |
| 2,436,979 | 3/1948 | Standley et al. | 117—139.5 |
| 2,500,523 | 3/1950 | Crosby et al. | 57—164 |
| 2,780,909 | 2/1957 | Biefeld et al. | 57—153 |
| 2,993,258 | 7/1961 | Spunt | 28—75 |
| 3,050,820 | 8/1962 | Pamm | 117—7 |
| 3,054,690 | 9/1962 | Miller et al. | 117—7 |
| 3,073,713 | 1/1963 | Brodeur | 117—7 |
| 3,135,624 | 6/1964 | Nakane et al. | 117—139.5 XR |

WILLIAM D. MARTIN, *Primary Examiner.*